(12) United States Patent
Cato et al.

(10) Patent No.: US 8,393,532 B2
(45) Date of Patent: Mar. 12, 2013

(54) USE OF PEER MAINTAINED FILE TO IMPROVE BEACON POSITION TRACKING UTILIZING SPATIAL PROBABILITIES

(75) Inventors: Robert Thomas Cato, Raleigh, NC (US); Thomas Guthrie Zimmerman, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 1967 days.

(21) Appl. No.: 11/427,939

(22) Filed: Jun. 30, 2006

(65) Prior Publication Data

US 2008/0000961 A1 Jan. 3, 2008

(51) Int. Cl.
*G06F 17/00* (2006.01)
*G06F 7/00* (2006.01)
*G06F 7/08* (2006.01)
*G06K 19/06* (2006.01)
*H04Q 5/22* (2006.01)
*G08B 1/08* (2006.01)

(52) U.S. Cl. ........ 235/376; 235/375; 235/449; 235/492; 340/10.1; 340/539.13; 342/385; 342/386

(58) Field of Classification Search .................. 235/375, 235/449, 492, 376; 340/10.1, 539.13; 342/385–386
See application file for complete search history.

(56) References Cited

U.S. PATENT DOCUMENTS

| | | | |
|---|---|---|---|
| 5,630,068 A | 5/1997 | Vela et al. | |
| 6,539,393 B1 | 3/2003 | Kabala | |
| 7,143,241 B2 * | 11/2006 | Hull | 711/133 |
| 2002/0046111 A1 | 4/2002 | Sumita et al. | |
| 2002/0161651 A1 | 10/2002 | Godsey et al. | |
| 2002/0167916 A1 | 11/2002 | Clapper | |
| 2005/0027443 A1 | 2/2005 | Cato | |
| 2006/0087474 A1 * | 4/2006 | Do et al. | 342/386 |

* cited by examiner

*Primary Examiner* — Michael G Lee
*Assistant Examiner* — Laura Gudorf
(74) *Attorney, Agent, or Firm* — Yee & Associates, P.C.; Tom Tyson

(57) ABSTRACT

A method for improving position beacon tracking using spatial probabilities is provided. A beacon identity recognition device receives a central probability file from a remote data processing system to form a local probability file. The device receives a current position beacon identity. The device compares current position beacon identity to a previous beacon identity stored in the local probability file to form a comparison. The device determines if the current position beacon identity is valid based on the comparison. The device transmits a valid position beacon identity to the remote data processing system. The device updates the local probability file and then combines a weighted version of the local probability file with a new copy of the probability file from the remote data processing system to form a combined probability file. The combined probability file is then sent to the remote data processing system and replaces the existing probability file.

20 Claims, 3 Drawing Sheets

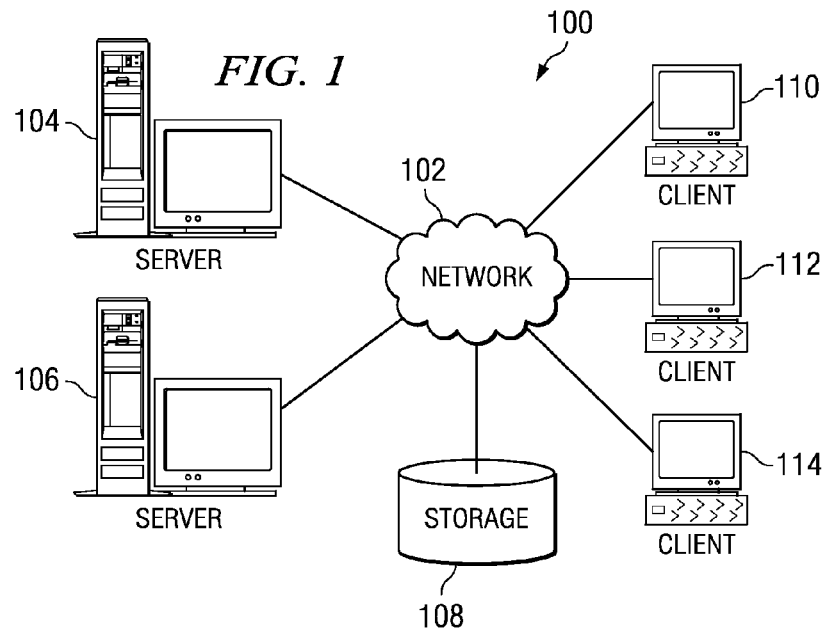
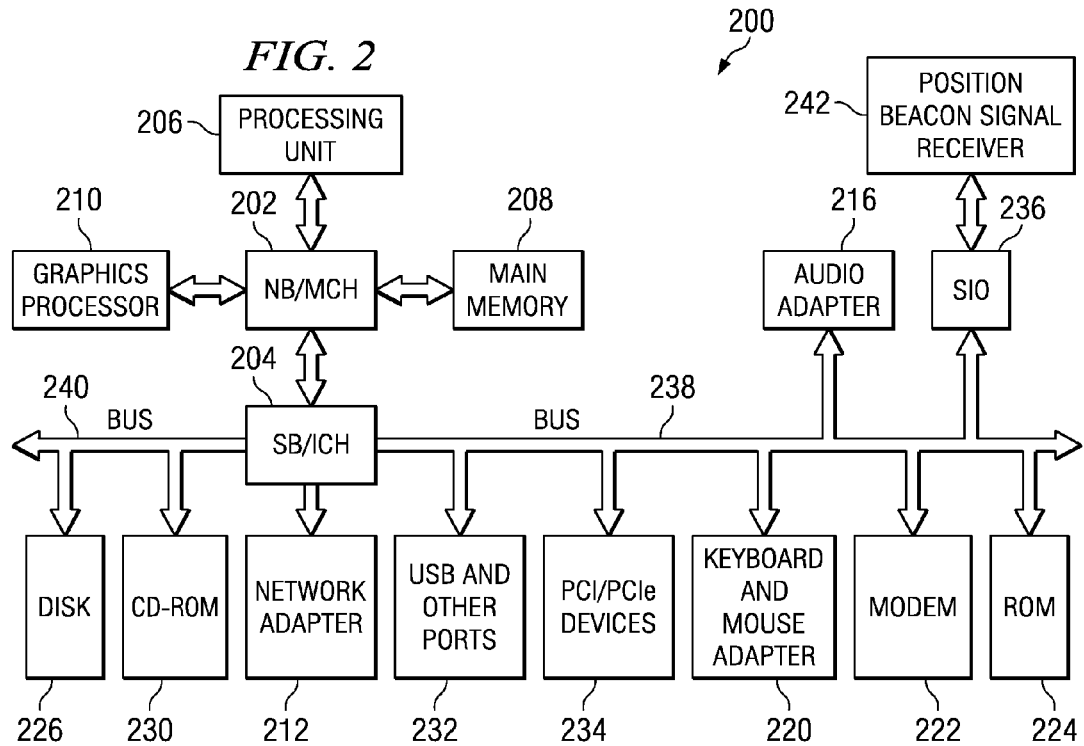

| BEACON ID | NEIGHBOR ID/ OCCURENCES | NEIGHBOR ID/ OCCURENCES | NEIGHBOR ID/ OCCURENCES | NEIGHBOR ID/ OCCURENCES |
|---|---|---|---|---|
| 1 | 7, 10 | 23, 8 | 15, 4 | 98, 1 |
| 2 | 43, 18 | 62, 4 | 84, 1 | 26, 1 |
| 3 | 74, 44 | 25, 27 | 13, 2 | 67, 1 |

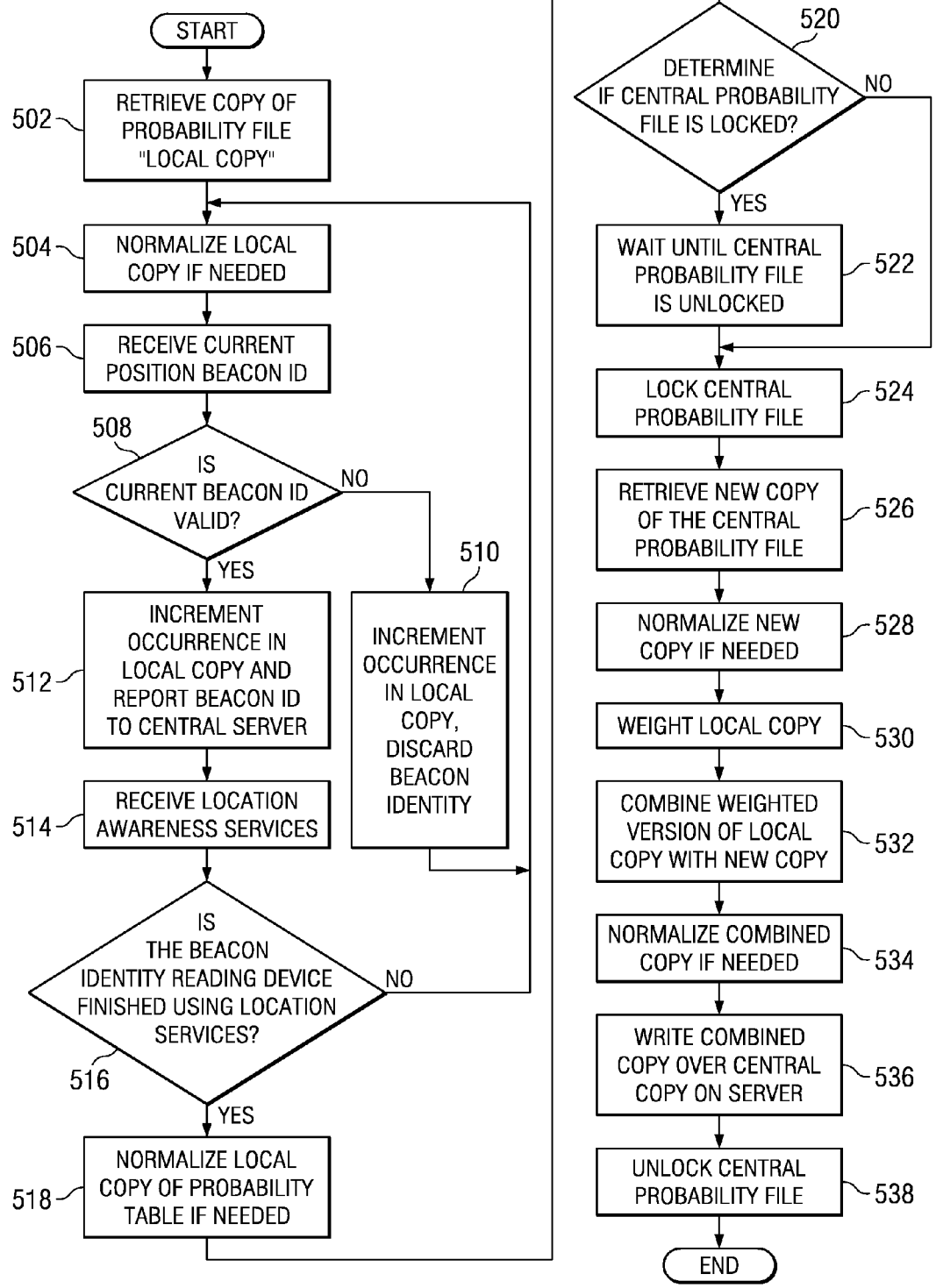

US 8,393,532 B2

USE OF PEER MAINTAINED FILE TO IMPROVE BEACON POSITION TRACKING UTILIZING SPATIAL PROBABILITIES

BACKGROUND OF THE INVENTION

1. Field of the Invention

The present invention relates generally to data processing systems. More specifically, the present invention relates to a computer implemented method, computer program product, and a system for improving position beacon tracking using spatial probabilities.

2. Description of the Related Art

Currently, some grocery stores employ wireless shopping services, such as, for example, IBM's Mobile Terminal-Retail (MTR). These types of systems typically employ wireless linked web browsers mounted on shopping carts to provide location awareness services, like spatially targeted advertising. For example, if the shopping cart is near the spaghetti a discount coupon for red wine may appear on the screen of the shopping cart.

Presently, the location of a shopping cart is determined by the device on the shopping cart detecting a location beacon in the ceiling. Such beacons are usually infrared beacons but the beacons can also be radio frequency based beacons, ultrasonic beacons, bar codes, visual cues, or other devices. Each beacon in the ceiling transmits a unique beacon identification that corresponds to a spatial location within the store. Occasionally an incorrect or wrong identification is interpreted by the device on the shopping cart, resulting in an erroneous position being determined, thus causing the wrong services to be delivered to the shopping cart.

Currently several methods are used to try and reduce incorrect interpretation of beacon identifications, including using checksum, checking for multiple identical beacon messages, and other error correction techniques. However, none of the present solutions take into account the spatial location of the signaling beacons.

BRIEF SUMMARY OF THE INVENTION

Exemplary embodiments describe a computer implemented method, a computer program product and a data processing system for improving position beacon tracking using spatial probabilities. A central probability file is received from a remote data processing system to form a local probability file. A current position beacon identity is received. The current position beacon identity is compared to a previous beacon identity stored in the local probability file to form a comparison. A determination is made as to whether the current position beacon identity is valid based on the comparison. A valid position beacon identity is transmitted to the remote data processing system. The local probability file is updated and weighted and then combined with a new copy of the central probability file from the remote data processing system to form a combined probability file. The combined probability file is then sent back to the remote data processing system and replaces the existing central probability file.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a pictorial representation of a network of data processing systems in which exemplary aspects may be implemented;

FIG. 2 is a block diagram of a data processing system in which exemplary aspects may be implemented;

FIG. 5 is a flowchart illustrating the operation of improving position beacon tracking using spatial probabilities in accordance with exemplary embodiments.

DETAILED DESCRIPTION OF THE INVENTION

Figures 3, 4:
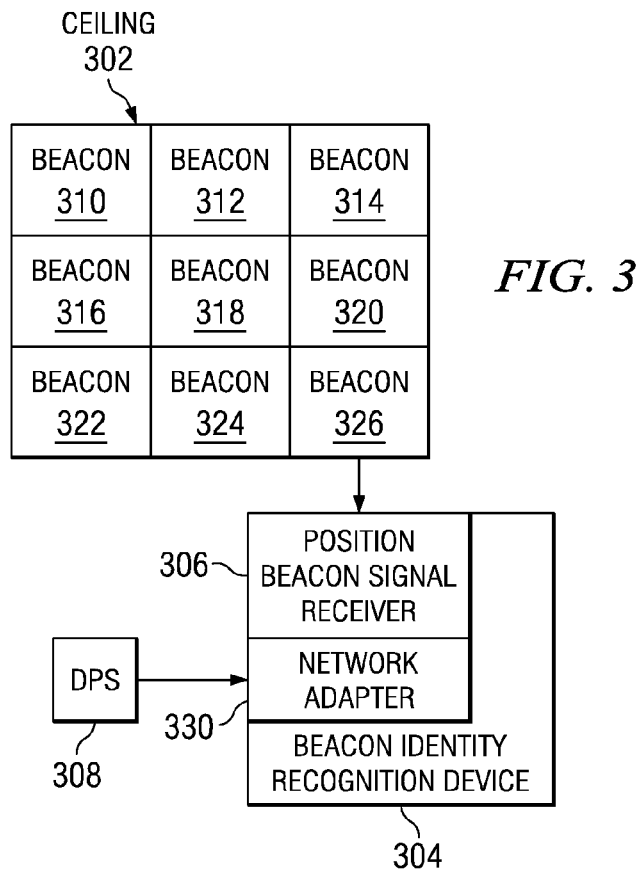
FIG. 3 is a block diagram depicting a system for improving position beacon tracking using spatial probabilities in accordance with exemplary embodiments.
FIG. 4 is an example of a probability file in accordance with exemplary embodiments.

FIGS. 1-2 are provided as exemplary diagrams of data processing environments in which embodiments may be implemented. It should be appreciated that FIGS. 1-2 are only exemplary and are not intended to assert or imply any limitation with regard to the environments in which aspects or embodiments may be implemented. Many modifications to the depicted environments may be made without departing from the spirit and scope.

With reference now to the figures, FIG. 1 depicts a pictorial representation of a network of data processing systems in which aspects may be implemented. Network data processing system 100 is a network of computers in which exemplary embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers or point of sale terminals or mobile terminals. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 can include a wireless LAN or the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which aspects may be implemented. Data processing system 200 is an example of a computer, such as server 104 or client 110 in FIG. 1, in which computer usable code or instructions implementing the processes for embodiments may be located.

In the depicted example, data processing system 200 employs a hub architecture including north bridge and memory controller hub (NB/MCH) 202 and south bridge and input/output (I/O) controller hub (ICH) 204. Processing unit 206, main memory 208, and graphics processor 210 are connected to north bridge and memory controller hub 202. Graphics processor 210 may be connected to north bridge and memory controller hub 202 through an accelerated graphics port (AGP).

In the depicted example, local area network (LAN) adapter 212 connects to south bridge and I/O controller hub 204. Audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

Hard disk drive 226 and CD-ROM drive 230 connect to south bridge and I/O controller hub 204 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 204. Position beacon signal receiver 242 is any type of device capable of receiving a signal from a position beacon, such as an infra-red receiver, radio frequency receiver, or an ultrasonic receiver. Position beacon signal receiver 242 may be connected to SIO 236.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java programming system, may run in conjunction with the operating system and provides calls to the operating system from Java programs or applications executing on data processing system 200 (Java is a trademark of Sun Microsystems, Inc. in the United States, other countries, or both).

As a server, data processing system 200 may be, for example, an IBM eServer™ pSeries® computer system, running the Advanced Interactive Executive (AIX®) operating system or LINUX operating system (eServer, pSeries and AIX are trademarks of International Business Machines Corporation in the United States, other countries, or both while Linux is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as hard disk drive 226, and may be loaded into main memory 208 for execution by processing unit 206. The processes for embodiments are performed by processing unit 206 using computer usable program code, which may be located in a memory such as, for example, main memory 208, read only memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 208, read only memory 224, or a cache such as found in north bridge and memory controller hub 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

FIG. 3 is a block diagram depicting a system for improving position beacon tracking using spatial probabilities in accordance with exemplary embodiments. Ceiling 302 has several position beacons, such as beacons 310, 312, 314, 316, 318, 320, 322, 324, and 326. The position beacons send a signal, either infra-red light, visible light, radio, sound, or other type signal to a receiving unit, such as position beacon signal receiver 306, which is part of beacon identity recognition device (BIRD) 304. IBM's Mobile Terminal-Retail is an example of a BIRD. Beacon identity recognition device 304 may be mounted on a shopping cart. Beacon identity recognition device 304 also comprises network adapter 330, which may be a wireless network adapter. The signal sent by the position beacon contains a unique identification tied to the spatial position of the beacon. Once the identification of the beacon has been verified, beacon identity recognition device 304 communicates with centrally located data processing system 308 via network adapter 330, relaying the identification of the position beacon. Data processing system 308 could be implemented as data processing system 200 in FIG. 2. Once data processing system 308 knows the identification of the position beacon and the location of the position beacon, and by association, the location of beacon identity recognition device 304, relevant location awareness services are transmitted to beacon identity recognition device 304 and displayed on a screen of beacon identity recognition device 304.

Previous implementations of position accuracy improvements involving spatial probability determine how reasonable a beacon identity is considering the previously received beacon identity and the known spatial relationship between the two. Furthermore, previous implementations of position accuracy improvements involving spatial probability usually require the spatial relationships to be manually entered or to be learned via a training process during which the system was moved and operated in a special mode by a skilled operator. A newly reported beacon identity that is spatially next to the previously reported beacon has a high probability of being correct. In contrast, a newly reported beacon identity that is spatially distant from the previously reported beacon identity has a low probability of being correct, as it is unlikely that a cart would move past many position beacons without receiving their beacon IDs.

For example, consider a line of position beacons labeled A, B, C, D, and so forth, wherein A is next to B, B is next to C, and so forth. If position beacon D is reported as being received and the next beacon identity received is C, then beacon identity C is a reasonable beacon identification. However, if position beacon D is reported and the beacon identity for position beacon L is received, then that is an unlikely beacon identity. That is because it is likely that the reporting rate of position beacons is such that the sequence of position beacons between the last reported beacon identity and the current reported beacon identity should include the sequence of beacon IDs in between.

Exemplary embodiments use spatial probability to suppress reporting unlikely beacon IDs, which are deemed to be erroneous. Exemplary embodiments dynamically update and share spatial probabilities by many position beacon reading devices, with a central file posting service, but without a central file processing service. Instead the probability file is processed by the individual position beacon identity reading device (BIRD), eliminating the need for a central processing service. Another exemplary embodiment enables the central probability file to be built automatically as the system is used, without the need for human involvement.

FIG. 4 is an example of a probability file in accordance with exemplary embodiments. Table 400 is an example of a probability file called a spatial probability identity table (SPIT). A typical SPIT has one row for each position beacon identity and multiple columns, one for each possible neighboring position beacon. Each column has two entries, a beacon identity and a number of occurrences. Table 400 is an example of a SPIT containing five columns: column 402 for the previously received beacon identities, and columns 404, 406, 408 and 410 for the currently received beacon identity, the neighbor identity, and the number of occurrences the neighbor identity has received For simplicity, Table 400 only shows three rows for previously received beacon identities with beacon identities 1, 2, and 3.

For example, if the current beacon identity was 25 and the previous beacon identity was 3, Table 400 shows this sequence had occurred 27 times and the number of occurrences for beacon identity 25 in row beacon identity 3 is incremented by one, from twenty-seven (27) to twenty-eight (28). In another example the current beacon identity is 26 and the previously received beacon identity is 2. This sequence has occurred once, and the number of occurrences for beacon identity 26 in row beacon identity 2 is incremented by one, from one (1) to two (2). If a newly received beacon identity has not been recorded as occurring for the previously received beacon identity, the newly received beacon identity is stored in an empty column for the previously received beacon identity, if an empty column is available. This allows for the introduction of new beacon identities to the system.

One or more methods may be used to determine if the current beacon identity is valid. In one embodiment the beacon identity reading device checks a local copy of the probability file to find the entry for the previously received beacon identity. Once this entry is found, the beacon identity reading device looks for a sub-entry for the current beacon identity in the previously received beacon identity entry. If a sub-entry is found for the current beacon identity, a number of occurrences for the current beacon identity is determined and this number of occurrences is compared to a maximum number of occurrences for a beacon identity in the entry of the previously received beacon identity.

If the number of occurrences of the current beacon identity is within a certain range of the maximum number of occurrences for a beacon identity in the entry of the previously received beacon identity, then the currently received beacon identity is determined to be valid. If the number of occurrences of the current beacon identity is not within a certain range of the maximum number of occurrences for a beacon identity in the entry of the previously received beacon identity, then the currently received beacon identity is determined to be invalid.

In one embodiment the threshold value is an absolute value for all beacon identities. In another embodiment the threshold value is a different value for each beacon identity, entered by a human operator, or automatically determined by (a) the number of false readings for each beacon identity; (b) a percentage of the maximum number of occurrences for a beacon identity; (c) the similarity of identity to neighboring beacon identity values that are easily substituted in the decode process, for example, identity beacons whose identity values vary by one bit; and (d) the environmental conditions at the location of a beacon, for example if the ambient light levels may make infra red transmission less reliable.

In the case where the probability file is a SPIT, the previously received beacon identity entry is a row containing columns and the sub-entry for the current beacon identity is a column in the row corresponding to the previously received beacon identity. The column also contains a number of occurrences for that current beacon identity.

Current beacon identity 26 in Table 400 of FIG. 4 may be a position beacon that was recently added near beacon identity 2 to the system of position beacons. Therefore, the number of occurrences of the beacon identity 26 in row beacon identity 2 will increase over times as the beacon identity receipt sequence is repeated over time by different beacon identity recognition devices. Eventually the number of occurrences will exceed the minimum threshold and beacon identity 26 would then be considered valid.

If the receiver on the beacon identity receiving device is covered while the device is moved to a new location, the current beacon identity received when the cover is removed may not have an entry in the local copy. The current beacon identity would be considered invalid and the beacon identity device would be temporarily lost. This can be prevented by considering a current identity valid if that identity is received M times in a row. The value M would be chosen such that it is very unlikely that the identity would be decoded erroneously that many times in a row. It is also possible to consider the identity valid if it is received P times within time Q, where choices P and Q would be influenced by the known time between transmissions of a beacon. This would allow reception of the new identity to be interleaved with the reception of other IDs in a location where the beacons transmissions of two or more beacons overlap.

The rows in probability Table 400 are normalized to keep the absolute value of an occurrence number from getting so large that the value would roll over during the combining of tables or normal incrementing. Since the numbers represent the probability of an identity being received after a specific previous identity, the absolute value of the occurrence number does not matter, but the relative value between the occurrence numbers does matter.

Normalization is a mathematical process that adjusts for differences among data from varying sources in order to create a common basis for comparison. In the context of exemplary embodiments, the probability file is normalized at various stages in the process so that new data added to the probability file will be meaningful. One method of normalization would be to divide each occurrence number in a row by the highest occurrence number in that row. A normalization method that is less computationally complicated would be to test to see if any of the occurrence numbers in a row exceed half the max value possible and then divide all entries by two, which is the same as shifting all binary values by 1, if that is the case. For example, if the max value allowed for an occurrence number is 255 for eight binary bits, then all the values in a row would be divided by two, shifted by one bit, if any occurrence value in the row exceeded a value of 128. Other methods of normalization are also possible.

Normalization and weighting methods that enable new beacon identities to be considered valid quicker would be to only normalize occurrence values greater than threshold B or to weight the occurrence values smaller than threshold C with a larger weight. The values of B and C would be chosen so that the normalization and weighting processes would not repeatedly reduce the occurrence values for new beacon IDs to the point that they were useless.

Consider a typical system of 100 BIRDs, such as beacon identity recognition device 304 in FIG. 3, 1000 position beacons, such as beacon 310 in FIG. 3, and a central server, such as data processing system 308 in FIG. 3. In the morning, or at the beginning of a shopping trip, each BIRD downloads a SPIT, such as Table 400 in FIG. 4, from the central server. The SPIT has 1000 rows, one for each position beacon identity and eight columns, one for each likely neighboring position beacon. Each column has two entries, a beacon identity and a number of occurrences. As each BIRD moves around, the BIRD receives beacon IDs. If the current detected beacon identity, called N, is different from the last detected beacon identity, called N−1, the BIRD tries to find beacon identity N in a column of row N−1. If the beacon identity N is present as a column of row N−1, the number of occurrences of beacon identity N is incremented. If there is no entry N, in a column of row N−1 and there is at least one empty column in row N−1, beacon identity N is added to row N−1. Otherwise, the beacon identity is not entered into the SPIT. An alternative is to replace the beacon identity in row N−1 with the lowest occurrence with beacon identity N and assign an occurrence value of 1 to beacon identity N.

If beacon identity N has an occurrence that is greater than an acceptance threshold, the position beacon is determined to be valid and is sent to the central server. In an exemplary embodiment the threshold is fixed. In an exemplary embodiment the acceptable threshold is ten percent (10%) of the number of occurrences of the most occurring beacon. In another embodiment, the threshold decreases in time to consider movement of beacon identity recognition device 304 in FIG. 3.

FIG. 5 is a flowchart illustrating the operation of improving position beacon tracking using spatial probabilities in accordance with exemplary embodiments. The operation begins when a beacon identification reading device, such as receiver 306 in FIG. 3, retrieves a copy of the central probability file, such as Table 400 in FIG. 4, from a central data processing system, such as data processing system 200 in FIG. 2 (step 502). The retrieved copy of the central probability file will be referred to as the "Local Copy". Next the Local Copy is normalized if needed (step 504). Normalization may be implemented utilizing any of a variety of methods, including, but not limited to, the methods described in relation to FIG. 4. Then the beacon identity reading device receives a current beacon identity (step 506).

Next, the beacon identity reading device determines if the current beacon identity is a valid beacon identity (step 508). The determination of the validity of beacon identities may be implemented utilizing any of a variety of methods, including, but not limited to, the methods described in relation to FIG. 4.

If the beacon identity reading device determines that the current beacon identity is invalid (a no response to step 508), the beacon identity reading device increments the number of occurrences for the current beacon identity in the Local Copy and discards the beacon identity (step 510). The beacon identity reading device returns to step 504 and normalizes the Local Copy, if needed.

If the beacon identity reading device determines that the current beacon identity is valid (a yes response to step 508), the beacon identity reading device increments the number of occurrences for the current beacon identity in the Local Copy and reports the current beacon identity to a central server (step 512). The beacon identity reading device then receives location awareness services from the central server and displays them on a screen for the user (step 514).

The operation determines if the beacon identity reading device is finished using location awareness services (step 516). If the operation determines that the beacon identity reading device is not finished using the location services (a no output to step 516), the operation returns to step 504. If the operation determines that the beacon identity reading device is finished using the location services (a yes output to step 516), the operation normalizes the Local Copy if needed (step 518). Details of normalization will be described later.

The operation determines if the central probability file is locked (step 520). If the operation determines that the central probability file is locked (a yes output to step 520), the operation waits until the central probability file is unlocked (step 522). Next the operation locks the central probability file so that the central probability file can only be changed by the current beacon identity reading device (step 524). The operation then retrieves a new copy of the central probability file (step 526).

Note that the probability file may be, but does not need to be, located on a central server. One of the beacon identity reading devices could perform the function of holding the central probability file that is described herein as a server function.

In an exemplary embodiment the probability file is initialized by assigning high probabilities, that is a large number of occurrences, to neighboring beacon identities from a store map of beacon locations, as shown by ceiling 302 in FIG. 3. In another embodiment the probability file start with all probabilities set to zero, and the probabilities of each beacon identity increases as beacons identities are detected. In the embodiment where the probabilities start at zero, the beacon identity reading devices do not use the probability file until a minimum number of occurrences have been recorded for a minimum percentage of the beacon identities.

The new copy of the central probability file is normalized, if needed (step 528). The Local Copy is weighted (step 530) and then combined with the new copy of the central probability file (step 532). An example of how to weight the Local Copy would be to weight the Local Copy with a binary weighting of ¼ or ⅛ or ¹⁄₁₆. Other weightings could be used, but binary is convenient because binary weighting may be achieved simply by shifting bits. The Local Copy could be weighted by ⅛ by shifting all of the binary values for the occurrences by three bit positions.

A combined copy of the central probability file would be created by adding the weighted Local Copy elements to the new copy of the central probability file, element by element.

In the case where a new beacon is added to the system, the beacon identity reading device records the new beacon identity and places the new identity in the Local Copy. Any new identity value in the Local Copy that is not found in the new copy of the central probability file would be added to a column for the appropriate row in the combined copy. A new column could be added to the combined copy or the element with the lowest number of occurrences in the appropriate row in the new copy could be replaced in the combined copy by an element with the new identity. The number of occurrences for the new element could be zero if needed. A more accurate method of weighting the local copy would be to normalize the local copy and the new copy by the same normalization method prior to weighting the local copy.

The operation normalizes the combined copy, if needed (step 534). The operation then writes the combined copy over the copy of the central probability file on the central server, thus replacing the central probability file (step 536), and unlocks the central probability file (step 538). Note that the server is not required to do any processing. The server is only needed to store and provide access to the central probability file to the beacon identity reading devices. One of the beacon identity reading devices could perform this function. The operation then ends.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for improving position beacon tracking using spatial probabilities, the computer implemented method comprising:
   a computer receiving a copy of a central probability file from a remote data processing system to form a local probability file;
   the computer receiving a current position beacon identity;
   the computer checking the local probability file to find an entry for a previously received position beacon identity;
   the computer, responsive to finding the entry for the previously received position beacon identity, finding a sub-entry for the current position beacon identity in a previously received position beacon identity;
   the computer, responsive to finding the sub-entry, determining a number of occurrences for the current position beacon identity;
   the computer comparing the number of occurrences for the current position beacon identity to a maximum number of occurrences for the previously received position beacon identity;
   the computer, responsive to determining that the number of occurrences of the current position beacon identity is within a range of a maximum number of occurrences for the previously received position beacon identity, determining that the currently received position beacon identity is valid;
   the computer, responsive to determining that the currently received position beacon identity is valid, updating the local probability file to form an updated local probability file;
   the computer receiving a new copy of the central probability file from the remote data processing system;
   the computer combining the updated local probability file with the new copy of the central probability file to form an updated central probability file; and
   the computer transmitting the updated central probability file to the remote data processing system.

2. The computer implemented method of claim 1, further comprising:
   the computer replacing the central probability file in the remote data processing system with the updated central probability file.

3. The computer implemented method of claim 1, further comprising:
   the computer replacing the central probability file stored in a local device with the updated central probability file.

4. The computer implemented method of claim 1, further comprising:
   the computer transmitting a valid position beacon identity to the remote data processing system.

5. The computer implemented method of claim 1, further comprising:
   the computer receiving spatial aware services from the remote data processing system based on the valid position beacon identity.

6. The computer implemented method of claim 1, further comprising:
the computer normalizing the updated local probability file.

7. The computer implemented method of claim 1, wherein the local probability file comprises a plurality of rows and wherein each row of the plurality of rows corresponds to a position beacon identity and wherein the computer updating the local probability file comprises the computer increasing a number of occurrences for the current position beacon identity in a row of the previous position beacon identity.

8. The computer implemented method of claim 2, wherein the updated local probability file is a weighted updated local probability file.

9. The computer implemented method of claim 2, further comprising:
the computer receiving, at a remote data processing system, a plurality of updated central probability files;
the computer combining, by the remote data processing system, the plurality of updated central probability files with a common central probability file, wherein each updated central probability file out of the plurality of updated central probability files is weighted to be of a predetermined value to each other updated central probability file out of the plurality of updated central probability files.

10. The computer implemented method of claim 1, wherein the steps of the computer receiving the new copy of the central probability file; the computer combining the updated local probability file with the new copy of the central probability file to form the updated central probability file; and the computer transmitting the updated central probability file to a remote data processing system are performed periodically.

11. A non-transitory computer program product comprising a computer readable medium including computer usable program code for improving position beacon tracking using spatial probabilities, the computer program product comprising:
computer usable program code for receiving a central probability file from a remote data processing system to form a local probability file;
computer usable program code for receiving a current position beacon identity;
computer usable program code for checking the local probability file to find an entry for a previously received position beacon identity;
computer usable program code for, responsive to finding the entry for the previously received position beacon identity, finding a sub-entry for the current position beacon identity in a previously received position beacon identity;
computer usable program code for, responsive to finding the sub-entry, determining a number of occurrences for the current position beacon identity;
computer usable program code for comparing the number of occurrences for the current position beacon identity to a maximum number of occurrences for the previously received position beacon identity;
computer usable program code for, responsive to determining that the number of occurrences of the current position beacon identity is within a range of a maximum number of occurrences for the previously received position beacon identity, determining that the currently received position beacon identity is valid;
computer usable program code for, responsive to determining that the currently received position beacon identity is valid, updating the local probability file to form an updated local probability file;
computer usable program code for receiving a new copy of the central probability file from the remote data processing system;
computer usable program code for combining the updated local probability file with the new copy of the central probability file to form an updated central probability file; and
computer usable program code for transmitting the updated central probability file to a remote data processing system.

12. The non-transitory computer program product of claim 11, further comprising:
computer usable program code for replacing the central probability file in the remote data processing system with the updated central probability file.

13. The non-transitory computer program product of claim 11, further comprising:
computer usable program code for replacing the central probability file stored in a local device with the updated central probability file.

14. The non-transitory computer program product of claim 11, further comprising:
computer usable program code for transmitting a valid position beacon identity to the remote data processing system.

15. The non-transitory computer program product of claim 11, further comprising:
computer usable program code for receiving spatial aware services from the remote data processing system based on the valid position beacon identity.

16. The non-transitory computer program product of claim 11, further comprising:
computer usable program code for normalizing the updated local probability file.

17. The non-transitory computer program product of claim 11, wherein the local probability file comprises a plurality of rows and wherein each row of the plurality of rows corresponds to a position beacon identity and wherein the computer usable program code for updating the local probability file comprises computer usable program code for increasing a number of occurrences for the current position beacon identity in the row of the previous position beacon identity.

18. The non-transitory computer program product of claim 11, wherein the updated local probability file is a weighted updated local probability file.

19. The non-transitory computer program product of claim 11, further comprising:
computer usable program code for receiving, at a remote data processing system, a plurality of updated central probability files;
computer usable program code for combining, by the remote data processing system, the plurality of updated central probability files in a common central probability file, wherein each updated central probability file out of the plurality of updated central probability files is weighted to be of a predetermined value to each other updated central probability file out of the plurality of updated central probability files.

20. A data processing system for improving position beacon tracking using spatial probabilities, the data processing system comprising:
a storage device, wherein the storage device stores computer usable program code; and
a processor, wherein the processor executes the computer usable program code to:

receive a central probability file from a remote data processing system to form a local probability file;

receive a current position beacon identity;

check the local probability file to find an entry for a previously received position beacon identity;

responsive to finding the entry for the previously received position beacon identity, find a sub-entry for the current position beacon identity in a previously received position beacon identity;

responsive to finding the sub-entry, determine a number of occurrences for the current position beacon identity;

compare the number of occurrences for the current position beacon identity to a maximum number of occurrences for the previously received position beacon identity;

responsive to determining that the number of occurrences of the current position beacon identity is within a range of a maximum number of occurrences for the previously received position beacon identity, determine that the currently received position beacon identity is valid;

responsive to determining that the currently received position beacon identity is valid, update the local probability file to form an updated local probability file; receive a new copy of the central probability file from the remote data processing system; combine the updated local probability file with the new copy of the central probability file to form an updated central probability file; and transmit the updated central probability file to a remote data processing system.

* * * * *